C. D. HIMEBAUGH.
HAND PLANTER.
APPLICATION FILED APR. 13, 1917.
1,252,802.
Patented Jan. 8, 1918.
2 SHEETS—SHEET 1.
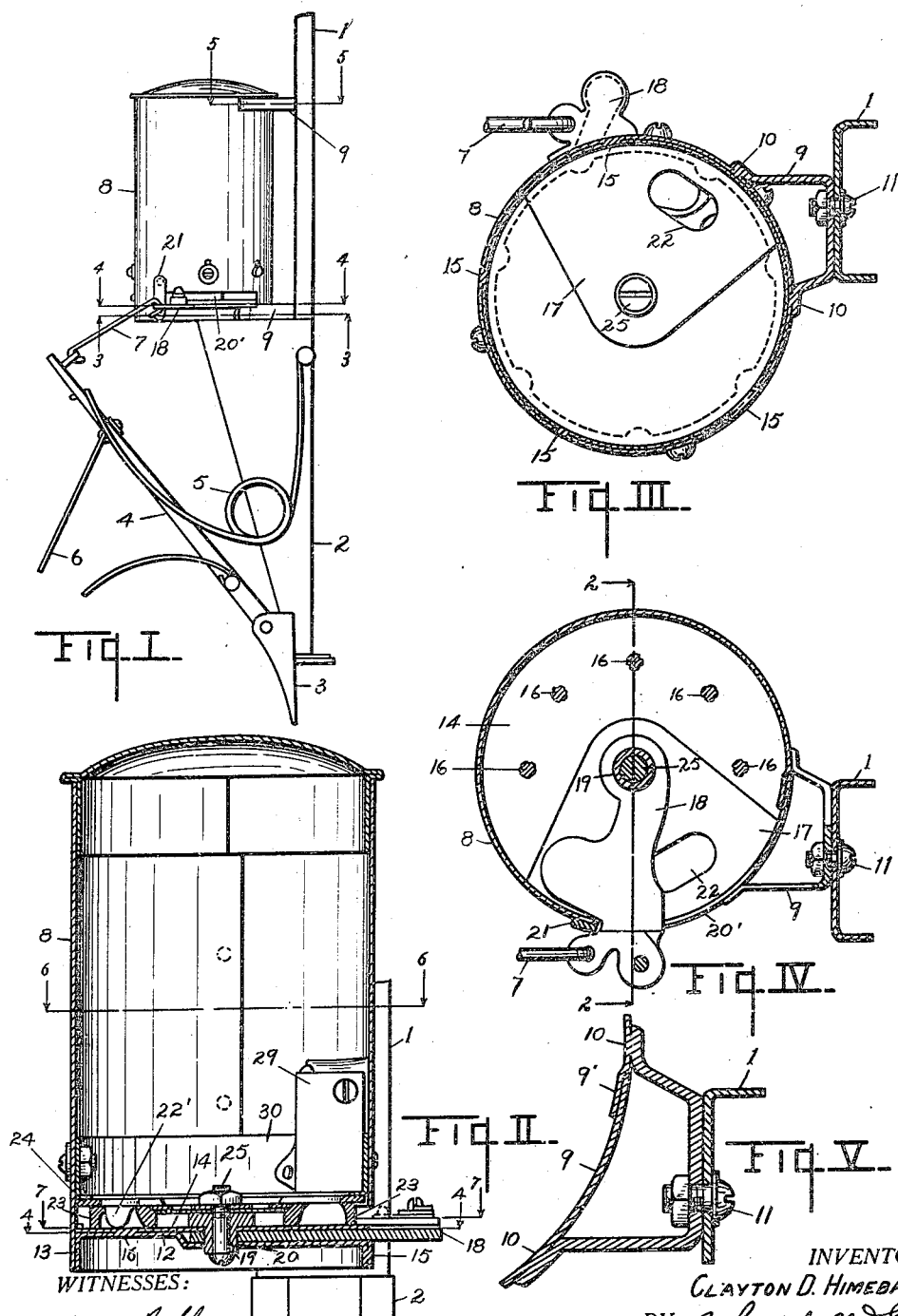
INVENTOR.
CLAYTON D. HIMEBAUGH
BY Chappell & Earl
ATTORNEYS.
WITNESSES:

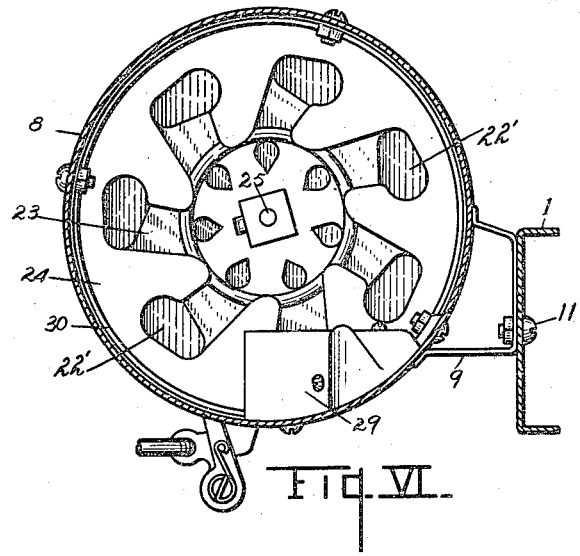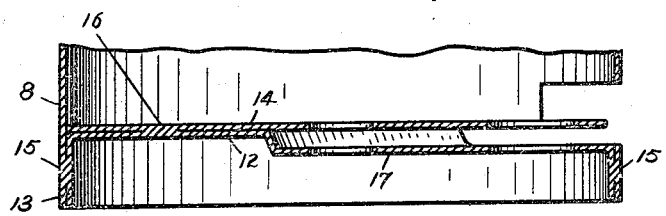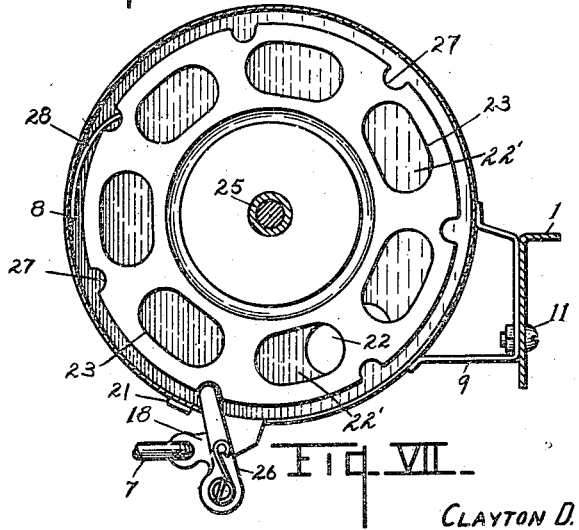

UNITED STATES PATENT OFFICE.

CLAYTON D. HIMEBAUGH, OF BURR OAK, MICHIGAN, ASSIGNOR TO SHEFFIELD MFG. CO., OF BURR OAK, MICHIGAN.

HAND-PLANTER.

1,252,802.   Specification of Letters Patent.   Patented Jan. 8, 1918.

Application filed April 13, 1917. Serial No. 161,763.

*To all whom it may concern:*

Be it known that I, CLAYTON D. HIMEBAUGH, a citizen of the United States, residing at Burr Oak, county of St. Joseph, State of Michigan, have invented certain new and useful Improvements in Hand-Planters, of which the following is a specification.

This invention relates to improvements in hand planters.

The main object of this invention is to provide in a hand planter an improved seed box, or hopper, and housing for the seed dropping mechanism, which is formed entirely of metal, and which, at the same time, is light in weight and more strong and durable than structures of this type heretofore manufactured, and also one which is economical to produce.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side elevation of a hand planter embodying my invention, the upper end of the staff and the handle being broken away and also the lower end of the foot for the actuating lever.

Fig. II is a detail vertical section through the hopper and feed mechanism taken on a line corresponding to line 2—2 of Fig. IV.

Fig. III is a detail horizontal section on a line corresponding to line 3—3 of Fig. I, showing details of the bottom of the hopper.

Fig. IV is a horizontal section through the bottom of the hopper showing structural details thereof taken on a line corresponding to line 4—4 of Figs. I and III.

Fig. V is an enlarged detail section on a line corresponding to line 5—5 of Fig. I, showing in detail of one of the brackets for securing the hopper to the staff.

Fig. VI is a detail section on a line corresponding to line 6—6 of Fig. II, showing details of the feed mechanism.

Fig. VII is a detail horizontal section on a line corresponding to line 7—7 of Fig. II, showing further details of the feed mechanism.

Fig. VIII is an enlarged detail vertical section corresponding to that of Fig. II, portions of the feed mechanism being omitted in order to more clearly disclose structural details.

In the drawing similar reference characters refer to similar parts throughout the several views, and the sectional views are taken looking in the direction of the little arrows at the ends of the section lines.

Referring to the drawing, my improved hand planter consists of a staff 1, preferably formed of sheet metal and channel-shaped in cross section, as illustrated. The chute 2 is mounted on the lower end of the staff to guide the grain from the hopper to the blade 3 which is mounted at the lower end thereof.

The actuating lever 4 for the movable blade, which is not illustrated herein, is returned to its initial position by the spring 5, one end of which is connected to the staff and the other to the arm. The lever 4 is provided with a foot 6 adapted to engage the ground to furnish a fulcrum for operating the planter. The upper end of the actuating lever 4 is connected to the feed mechanism actuating lever, to be hereinafter described, by means of the link 7. The details of these parts form no part of this invention and, therefore, are not further illustrated or described herein.

The seed box or hopper 8 is made of thin sheet metal and is attached to the staff 1 by means of the metal brackets 9. The ends of these brackets 9 are lapped upon and spot welded to the sides of the seed box at 10. These brackets are disposed to bridge the seam 9' of the hopper, thereby supporting and reinforcing the same. The brackets 9 are secured to the staff 1 by means of bolts 11.

The seed box or hopper 8 comprises a cylindrical wall member and a bottom consisting of a circular plate 12 of thin sheet metal having a downturned peripheral flange 13 and a superimposed disk or plate 14, also of thin sheet metal. The diameters of the plates 12 and 14 are such that they fit within the cylindrical wall member with the flange 13 in contact with the walls thereof, the lower edge of the flange being flush with the lower edge of the body of the hopper. The flange 13 is secured to the wall of the hopper at intervals by spot welding 15, while the plate 12 and the disk 14 are secured together at intervals by spot welds 16. This manner of forming and connecting the parts permits the use of thin sheet metal and at the same time provides a very rigid and strong structure.

The bottom plate 12 has a segmental recess or depression 17 therein, the inner end of the recess being extended beyond the center of the bottom for the purposes which will hereafter appear. This recess is died or pressed into the bottom plate and this serves to make the plate 12 more rigid and when reinforced by the plate 14 secured thereto by spot welding, as described, becomes very rigid and is not likely to spring or buckle under the strains to which it is subjected in use. The bottom plate 14 forms a cover for the recess 17, thus providing an inclosed housing for the feed lever 18 and also a smooth support for the rotatable feed members supported thereon. The lever 18 is mounted on the bearing 19 disposed through the central hole 20 in the bottom plate, the bearing having a shoulder on its upper end resting on the bottom,—see Fig. II.

The lever 18 projects through the slot 20 in the wall of the hopper to permit the connection of the link 7 thereto. The ends of the slot constitute stops limiting the movement of the lever. A reinforcing stop plate 21 is provided at the front end of the slot to receive a part of the wear and shock of the lever as it is forced to its initial position by means of the spring 5 acting upon the actuating lever.

The plates 12 and 14 are provided with alined openings 22 through which the grain is discharged into the hopper. The feed mechanism comprises a pair of members 23 and 24 formed to provide feed pockets 22'. The feed members 23 and 24 are mounted on the pivot 25 to revolve upon the bottom and discharge the grain through the openings 22. These feed members 23 and 24 are adjustably associated, but as these details form no part of my present invention they are not further described herein. An annular flanged retaining member 30 is secured within the hopper above the seed members so that they are retained thereby.

The feed members are operated by the pawl 26 mounted upon the lever 18 and disposed through the slot 20 to engage peripheral notches 27 in the feed member 23.—see Fig. VII. A spring dog 28 coacts with these notches 27 to hold the feed members against accidental misplacement.

A guard and feed control brush, designated generally by the numeral 29, is positioned above the discharge openings 22.

By thus arranging the parts, the hopper or seed box may, as stated, be formed of thin sheet metal and thus may be kept within reasonable limits in the matter of weight, and, at the same time, the structure is rigid, strong, durable and economical to produce. The bottom plate, being secured by spot welds, no bolts or rivets are present to loosen or interfere with the operation of the feed members upon the bottom. Further, the parts are very compact and the moving parts are not likely to become inoperative or difficult of operation on account of springing, sagging, or warping of the supports and housings under various conditions to which the planters are subject in use.

Having thus described my invention, what I claim as new and desire to secure by Letters Patent, is:

1. In a planter, the combination of a hopper comprising a cylindrical metal wall member having a horizontal slot adjacent the lower end thereof, and a bottom consisting of superimposed plates of thin sheet metal, the lower plate being provided with a peripheral downturned flange fitting within said wall member, said plates being rigidly secured together and said flange being rigidly secured to said wall member by spot welding, said lower plate having a segmental recess pressed therein, the upper plate being flat and constituting a cover for said recess and a smooth support for the rotatable feed members superimposed thereon, said plates having central bearing openings and alined discharge openings therein, a feed lever disposed in said recess to project through said slot, a shouldered bearing for said lever disposed through said bearing openings in said bottom plates, feed members rotatably mounted on said bottom, a journal therefor disposed through said lever bearing member, a retaining ring for said feed members arranged within said hopper, and operating connections for said lever to said feed members.

2. In a planter, the combination of a hopper comprising a cylindrical sheet metal wall member having a horizontal slot adjacent the lower end thereof, and a bottom consisting of superimposed plates of thin sheet metal, the lower plate being provided with a peripheral downturned flange fitting within said wall member, with its lower edge flush with the lower edge of said wall member, said plates being rigidly secured together and said flange being rigidly secured to said wall member by spot welding, said lower plate having a segmental recess pressed therein, the upper plate being flat and constituting a cover for said recess and a smooth support for the rotatable feed members superimposed thereon, said plates having alined discharge openings therein, a feed lever disposed in said recess to project through said slot, feed members rotatably mounted on said bottom, and operating connections for said lever to said feed members.

3. In a planter, the combination of a hopper comprising a cylindrical sheet metal wall member having a horizontal slot adjacent the lower end thereof, and a bottom consisting of superimposed plates of thin sheet metal, the lower plate being provided with a peripheral downturned flange fitting within said wall member, said plates being rigidly secured together and said flange being rigidly secured to said wall member by spot welding, said lower plate having a segmental recess pressed therein, the upper plate being flat and constituting a cover for said recess and a smooth support for the rotatable feed members superimposed thereon, said plates having alined discharge openings therein, a feed lever disposed in said recess to project through said slot, feed members rotatably mounted on said bottom, and operating connections for said lever to said feed members.

In witness whereof, I have hereunto set my hand and seal in the presence of two witnesses.

CLAYTON D. HIMEBAUGH. [L. S.]

Witnesses:
 MYRTIE M. HINCHU,
 ARCHIE JONES.

Copies of this patent may be obtained for five cents each, by addressing the "Commissioner of Patents, Washington, D. C."